United States Patent Office 3,210,373
Patented Oct. 5, 1965

3,210,373
PREPARATION OF 3-METHYL-2-PYRROLIDINONES
Richard S. Cook, Doylestown, and Michael C. Seidel, Levittown, Pa., assignors to Rohm & Haas Company, Philadelphia, Pa., a corporation of Delaware
No Drawing. Filed Sept. 20, 1962, Ser. No. 225,129
6 Claims. (Cl. 260—326.5)

This invention concerns a method for the manufacture of 1-aryl-3-methyl-2-pyrrolidinones of the formula

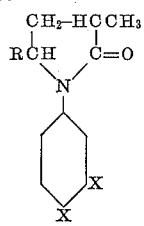

wherein

R is hydrogen or a methyl group,
X is chlorine, methyl, methoxy, or methylthio with the proviso that if one X is methoxy or methylthio, the other X is chlorine.

The 1-aryl-3-methyl-2-pyrrolidinones of the above general formula are outstandingly effective as selective herbicides. They possess both post-emergence and pre-emergence herbicidal activity, and at the same time a number of agronomic crops are tolerant to them. These compounds also have an effect on the nitrogen cycle and will produce an increased growth of those plants which prefer ammonium nitrogen as their source of nitrogen nutrients. The 3-methyl-2-pyrrolidinones of this invention, therefore, are a valuable addition to the arsenal of plant growth regulating chemicals available to the agronomist, farmer, horticulturist, and other growers of useful plants.

Heretofore, the most general method for preparing N-aryl-2-pyrrolidinones was to react an aniline of the formula

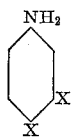

with a lactone of the formula

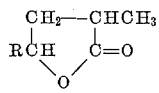

wherein R and X have the significance given above. Also, methods involving ring closure such as by cyclization or condensation reactions to form the heterocyclic ring are known, but such methods are too cumbersome to be used for anything other than special cases and specific circumstances.

By the present invention there is now made available a novel synthesis for this important group of heterocycles which is of general use, is easily manipulated, utilizes readily available raw materials, and gives acceptably high yields and purities.

This new method of preparation comprises (1) acylating an N-aryl-2-pyrrolidinone as herein defined in the 3-position by reaction of the heterocycle with an ester of a mono- or dicarboxylic acid, $R^1COOR^\circ$ as defined below, in the presence of an alkaline condensing agent to give a 1-aryl-3-acyl-2-pyrrolidinone, and (2) reacting the 1-aryl-3-acyl-2-pyrrolidinone with a methylating agent by which the acyl group is replaced with a methyl group to give a 1-aryl-3-methyl-2-pyrrolidinone.

The following equations illustrate the reactions involved:

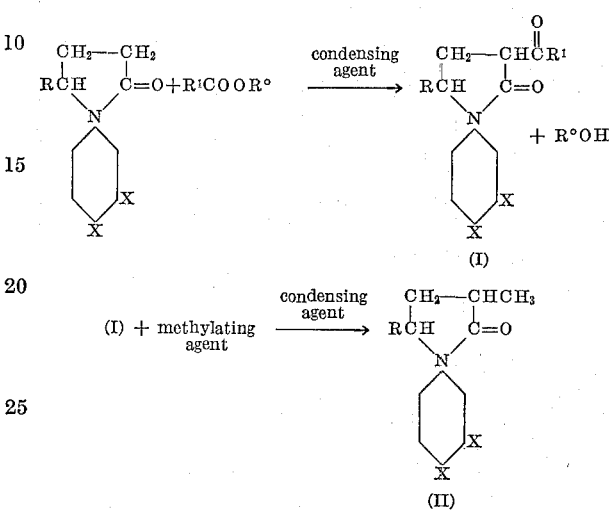

The starting 2-pyrrolidinones used in this series of reactions are those depicted by the structural formula

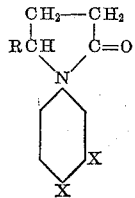

wherein R and X have the significance given above. Such 2-pyrrolidinoes as the following are thus useful:

1-(3,4-dichlorophenyl)-2-pyrrolidinone,
1-(3,4-dimethylphenyl)-2-pyrrolidinone,
1-(3-chloro-4-methylphenyl)-2-pyrrolidinone,
1-(4-chloro-3-methylphenyl)-2-pyrrolidinone,
1-(3-chloro-4-methoxyphenyl)-2-pyrrolidinone,
1-(3-methylthio-4-chlorophenyl)-2-pyrrolidinone,
1-(3,4-dichlorophenyl)-5-methyl-2-pyrrolidinone,
1-(3,4-dimethylphenyl)-5-methyl-2-pyrrolidinone, or
1-(chloro-4-methylthiophenyl)-5-methyl-2-pyrrolidinone.

The esters useful for the acylation of the N-aryl-2-pyrrolidinones may be represented by the formula

$$R^1COOR^\circ$$

wherein $R^\circ$ is alkyl and $R^1$ is hydrogen, alkyl, preferably of one to three carbon atoms, phenyl, oxyalkyl —$OR^\circ$ or carboalkoxy —$COOR^\circ$. Such esters as alkyl formates acetates, propionates, butyrates, carbonates, oxalates, and benzoates are operable in the reaction. The $R^\circ$ group may be derived from alkanols of one to 12 carbon atoms. During the acylation reaction an alcohol, $R^\circ OH$, is split out and is removed by volatilization. It is desirable, therefore, to use an alkyl group of low carbon content so as to produce a low-boiling and readily removed alcohol. For this reason, methyl or ethyl esters are preferred.

The reaction of an N-aryl-2-pyrrodilinone with the ester R¹COOR° proceeds in the presence of an alkaline condensing agent. Such agents are well-known to organic chemists and of this class the readily available and conventional agents are alkali metal hydoxides, alkali metal alkoxides, alkali metals, alkali metal hydrides, or alkali metal amides. The usual alkali metals are sodium and potassium. Of the alkali metal alkoxides, the methoxides are to be preferred, such as sodium or potassium methoxide.

The acylation of N-aryl-2-pyrrolidinones with esters proceeds best in the presence of a solvent, such as dimethylformamide, mixtures of dimethylformamide and hydrocarbons, acetonitrile, dimethyl sulfoxide, methyl formate, and pyridine. The preferred solvent is dimethylformamide.

The preferred temperature for the acylation reaction is about room temperature in the 20° to 40° C. range, although the reaction proceeds satisfactorily in reasonable time, from about one to six hours, in the range 10° to 90° C. The upper temperature which is used should be below the temperature at which there occurs an appreciable reaction between ester and condensing agent. For example, methyl benzoate reacts with sodium methoxide at 100° C. to give a substantial yield of dimethyl ether and, for this reason, the disappearance of methyl benzoate due to this side reaction is detrimental to the desired acylation of the 2-pyrrolidinone nucleus.

In the acylation of 2-pyrrolidinones with esters, the mole ratios of the ester to the pyrrolidinone are desirably in the range of 1.5:1 to 4:1, with a preferred range of 2:1 to 3:1. It is also preferred to have the number of moles of the alkaline condensing in the range of 1.5:1 to 3:1 based on the number of moles of pyrrolidinone used.

The progress of the acylation reaction may be conveniently followed by means of gas-liquid chromatography. The product formed may be the sodium enolate of the enol form exemplified by structure (III). The 1-aryl-3-acyl-2-pyrrolidinones may be isolated by quenching in dilute hydrochloric acid followed by filtering, washing, and drying. It is not necessary to isolate the acylated 2-pyrrolidinone prior to the subsequent methylation; the reaction mixture may be used directly.

As shown by infrared data, the acylated compounds represented by structure (I) may exist in either the enol form (III)
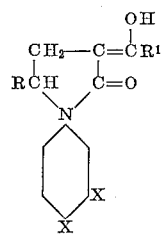

or the keto form (I) or a mixture of these.

In the methylation of 1-aryl-3-acyl-2-pyrrolidinones, the acyl group is replaced by a methyl group. A methylating agent is required for this reaction. Methyl halides are preferred. For reasons of economy, methyl chloride is preferred, and liquid methyl iodide is preferred where convenience in handling is a factor.

The methylation reaction takes place in the presence of an alkaline condensing agent. Such agents as those described above for the acylation reaction are used. The readily available agents include alkali metal hydroxides, alkali metals, alkali metal alkoxides, alkali metal hydrides, or alkali metal amides. For these agents, the alkali is preferably sodium or potassium. Of the alkali hydroxides, potassium hydroxide is preferred. Of the alkali metal alkoxides, the methoxides, such as sodium or potassium methoxide, are to be preferred.

Yields of products are in part governed by the mole ratios of the reactants. The methylating agent may be varied in the range of 1.5 to 2.5 equivalents per mole of the 2-pyrrolidinone and the condensing agent from 1 to 2.5 equivalents per mole of the 2-pyrrolidinone. A molar ratio which gives optimum results is considered to be 2-pyrrolidinone:methylating agent:alkaline condensing agent of 1:2:2.2.

Another factor which influences the course of the methylation reaction and the yield of product is the order of addition of the reactants. It has been observed that better yields of the desired 3-methyl-2-pyrrolidinone are obtained when the methylating agent is added first and the alkaline condensing agent last to a slurry of the starting 3-acyl-2-pyrrolidinone than when the reverse order of adding the two agents is followed.

The methylation of 1-aryl-3-acyl-2-pyrrolidinones is preferably carried out in the presence of a solvent. Solvents such as dimethylformamide, methanol, acetonitrile, dimethyl sulfoxide, and pyridine may be used. Dimethylformamide and methanol are preferred solvents, and of these dimethylformamide allows the reaction to proceed at a faster rate.

The temperature for the methylation reaction may be carried out over a range of 20° to 100° C. One major factor governing the temperature chosen is the methylating agent employed. With methyl iodide the preferred reaction temperature is just below its boiling point in the range 30° to 40° C., with methyl bromide 45° to 65° C., and with methyl chloride 75° to 100° C. Since methyl bromide and chloride are gases at ordinary temperatures, reactions using these are preferably carried out under pressure, such as 5 to 15 inches of mercury.

The time required for the methylation reaction is variable and is dependent in part on the choice of the methylating agent and the reaction temperature. The reaction time may be varied from 1 to 35 hours, although for reasons of economy it is preferred to have it in the range of one to six hours. Generally, the reaction is more rapid at higher temperatures. The reaction mixture may sometimes be advantageously heated to a higher temperature after the addition of the methylating agent in order to hasten completion of the reaction.

It is most likely that the methylation proceeds by an O-methylation of the enol form of the 1-aryl-3-acyl-2-pyrrolidinone, followed by migration of the methyl group to the nucleus and elimination of R¹COOCH₃. The following equation with sodium methoxide as the condensing agent and methyl iodide as the methylating agent is illustrative of one mechanism for the reaction:

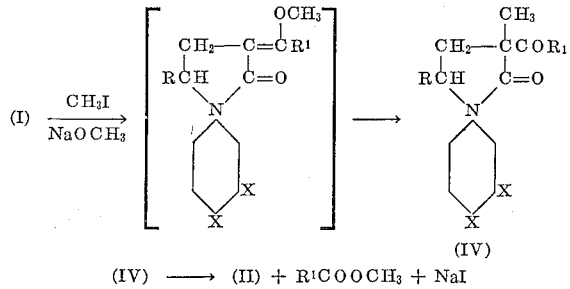

(IV) ⟶ (II) + R¹COOCH₃ + NaI

Compounds of the structure of (IV) are isolatable. For example, structure (IV), wherein R is hydrogen, R¹ is phenyl, and the X's are chlorine, is a white solid melting at 137 to 138° C. and is shown to be in the keto form by its infrared spectrum.

The course of the replacement of a 3-acyl group with a 3-methyl group may be conveniently followed by gas-liquid chromatography. For example, in the first part of the reaction, there is a build-up in the amount of structure (IV) until it reaches a peak and then there is a gradual decrease. At the same time, there is a gradual decrease in the structure (I) compound and an increase in the desired product, structure (II). When the chromatogram indicates an essential completion of the reaction, the reaction mixture is worked up. A convenient method of isolating the 1-aryl-3-methyl-2-pyrrolidinone is to dilute the reaction mixture with water, extract with a water-insoluble solvent in which the product is soluble, such as aromatic hydrocarbons or chlorinated aliphatic hydrocarbons, wash with water and dilute hydrochloric acid, and remove the solvent and other volatile impurities by heating under reduced pressure. By such procedures, products of at least 90% purity are usually obtained.

The following examples illustrate the process but are not to be construed as limiting.

*Example 1.—Preparation of 1-(3,4-dichlorophenyl)3-methyl-2-pyrrolidinone with isolation of the acylated intermediate*

(a) *Preparation of 1-(3,4-dichlorophenyl)-3-benzoyl-2-pyrrolidinone.*—Into a 12 liter 3-necked flask outfitted with a stirrer, thermometer, condenser and addition funnel was placed 5 liters of dimethylformamide and 324 grams (6 moles) of sodium methoxide. This gave a slurry to which was added in 5 minutes at 25° C. 690 grams (3 moles) of 1-(3,4-dichlorophenyl)-2-pyrrolidinone. To the stirred mixture was added 816 grams (6 moles) of methyl benzoate over a period of 3.5 hours. An exotherm resulted in a temperature rise to 38° C. The mixture stood overnight and was then stirred for 6 hours at room temperature. The resulting slurry was poured into 8 liters of 5% hydrochloric acid contained in a 22 liter flask. The solid residue was removed by filtration, washed with water and air-dried to give 1017 grams of solid melting at 104° to 106° C. This solid was slurried with 3.17 liters of isopropanol to give 890 grams of tan solid melting at 106° to 110° C. By gas-liquid chromatography this was found to be essentially pure 1-(3,4-dichlorophenyl) - 3 - benzoyl-2-pyrrolidinone and as such the solid represents an 88% yield. As shown by infrared spectra, when this solid was recrystallized from acetic acid, it gave the pure keto form melting at 121° to 122° C. and when recrystallized from hot methanol it gave the pure enol form melting at 107° to 108° C.

(b) *Methylation of 1-(3,4-dichlorophenyl)-3-benzoyl-2-pyrrolidinone.*—A mixture of 502 grams (1.5 moles) of 1 - (3,4 - dichlorophenyl)-3-benzoyl-2-pyrrolidinone, 425 grams (3 moles) or methyl iodide and 3 liters of methanol was stirred while 178 grams (3.3 moles) of sodium methoxide was added over a period of 3 hours. The mixture was then warmed at 38° to 40° C. for another 3 hours. The resulting brown solution was poured into 6 liters of water and 2 liters of benzene. The benzene layer was washed twice with 2 liters of warm water and once with 1 liter of slightly acidified water. The organic layer was then heated at 100° C. and 20 mm. pressure to remove benzene and was stripped of other volatile impurities by heating at 160° to 180° C. at 20 mm. pressure. The residue was 337 grams of a brown oil which solidified to a brown solid melting at 87° to 89° C. It was 1-(3,4-dichlorophenyl)-3-methyl-2-pyrrolidinone in a 90% yield and was shown to be 97.5% pure by gas-liquid chromatography.

When in the above preparation the sodium methoxide is replaced by an equivalent amount of potassium hydroxide pellets and the reaction mixture is worked up in substantially the same manner, 1-(3,4-dichlorophenyl)-3-methyl-2-pyrrolidinone is obtained. The yield of this, however, is somewhat less than 90%.

*Example 2.—Preparations of 1-(3,4-dichlorophenyl)-3-methyl-2-pyrrolidinone without isolation of the acylated intermediate*

(a) A slurry of 108 grams (2 moles) of sodium methoxide in 1 liter of dimethylformamide is placed in a vessel suitable for withstanding modest pressures and there is immediately added 230 grams (1 mole) of 1-(3,4-dichlorophenyl)-2-pyrrolidinone and the mixture is agitated for 30 minutes. There is then added over a period of 30 minutes 272 grams (2 moles) of methyl benzoate and the slurry is agitated for three hours at 25° to 35° C. Following this, 68 grams (1.25 moles) of sodium methoxide is added. The reactor is closed and pressure tested with nitrogen to a pressure of 14 inches of mercury. After venting, methyl chloride gas is introduced and the reactor is heated at 70° to 80° C. with the pressure being maintained at 10 to 14 inches of mercury. The rate of addition of methyl chloride is so adjusted that 101 grams (2 moles) are added in about three hours, after which the reaction mixture is agitated at 70° to 80° C. for about three hours. The system is vented, cooled to 50° C., 51 grams (0.95 mole) of sodium methoxide is added in one portion and the system is then maintained at 50° C. for one hour. The reaction mixture is quenched in water and extracted with benzene. The benzene solution is washed with water and with slightly acidulated water, then heated up to 170° C. and 20 mm. pressure until volatile impurities are removed. The resulting product is over 90% pure 1-(3,4-dichlorophenyl)-3-methyl-2-pyrrolidinone with the major impurity being the starting 1-(3,4-dichlorophenyl)-2-pyrrolidinone. It is acceptable for formulating as a herbicide without further purification.

Equimolar quantities of methyl bromide may be substituted for methyl chloride in the above preparation to achieve similar results. When an equimolar quantity of dimethyl sulfate was used in place of the above methyl halides, the desired 3-methyl-2-pyrrodidinone was obtained in a yield less favorable than when the methyl halides were used.

(b) A reaction mixture consisting of 11.5 grams (0.05 mole) of 1-(3,4-dichlorophenyl)-2-pyrrolidinone and 14.6 grams (0.1 mole) of diethyl oxalate in 50 ml. of dimethylformamide was stirred as there was added 6 grams (0.11 mole) of sodium methoxide. An exotherm resulted in a temperature rise from that of the room up to 62° C. The mixture was stirred two hours and then was heated at 65° C. for one hour. The resulting slurry was cooled to room temperature and there was added 15 grams (0.105 mole) of methyl iodide. The mixture was stirred at room temperature for 15 hours. It was then poured into an excess of 5% hydrochloric acid to give an oil from which was isolated a 40% yield of 1-(3,4-dichlorophenyl)-3-methyl-2-pyrrolidinone.

If in the above preparation the slurry obtained just prior to the addition of the methyl iodide is quenched in 5% hydrochloric acid, there is obtained an insoluble residue. This solid may be recrystallized from acetic acid to give an 81% yield of a light green solid melting at 160° to 162° C. By infrared data, this is shown to be the enol form of 1 - (3,4 - dichlorophenyl)-3-ethoxyoxalyl-2-pyrrolidinone, which may serve as an intermediate for giving the desired final product, a 3-methyl-2-pyrrolidinone.

When in the above preparation diethyl oxalate is replaced with an equivalent quantity of dimethyl carbonate and the reaction is carried out essentially as above, acylation to the 3-carbomethoxy derivative results followed by replacement of the acyl group with a methyl group. Yields of the 1-(3,4-dichlorophenyl)-3-methyl-2-pyrrolidinone are somewhat better than with diethyl oxalate. The intermediate 1 - (3,4-dichlorophenyl)-3-carbomethoxy-2-pyrrolidinone may be isolated from the acylation reaction prior to its methylation. It is a white solid melting at 91° to 93° C. and was found to contain by analysis 50.21% C and 4.89% N; calculated for $C_{12}H_{11}Cl_2NO_3$ is 50.02% C and 4.86% N.

(c) A solution of 23 grams (0.1 mole) of 1-(3,4-dichlorophenyl)-2-pyrrolidinone in 150 ml. of dimethylformamide is cooled to less than 5° C. and 11.9 grams (0.22 mole) of sodium methoxide is added over a period of 10 minutes. With continued cooling and stirring, there is next added 13.3 grams (0.18 mole) of ethyl formate in 12 minutes. A slurry results which is stirred 15 hours at room temperature. Then there is added 30 grams (0.21 mole) of methyl iodide and the mixture again stirred for 15 hours at room temperature. 1-(3,4-dichlorophenyl)-3-methyl-2-pyrrolidinone is isolated from the reaction mixture by quenching in 5% hydrochloric acid, washing with water, filtering and air-drying.

When, in the above preparation, the reaction mixture just prior to the addition of methyl iodide is poured into dilute hydrochloric acid, there is isolated 21 grams of a tan solid melting at 105° to 107° C. This solid contained by analysis 5.32% N and 27.38% Cl; calculated for $C_{11}H_9Cl_2NO_2$ is 5.43% N and 27.48% Cl. Infrared data and the analyses confirm that the compound is 1-(3,4-dichlorophenyl)-3-formyl-2-pyrrolidinone.

(d) To a solution consisting of 11.5 grams (0.05 mole) of 1-(3,4-dichlorophenyl)-2-pyrrolidinone, 4 ml. of ethyl acetate, and 50 ml. of dimethylformamide is added 7 grams (0.13 mole) of sodium methoxide. An exotherm results in a temperature rise to about 40° C. and the mixture becomes viscous. After stirring one hour, 8 cc. more of ethyl acetate is added which makes a total of 0.136 mole. The mixture is then stirred for 3 hours after which it is heated for 1 hour at 60° to 65° C. There is then added 15 grams (0.105 mole) of methyl iodide and the mixture is stirred 15 hours at room temperature. From the resulting product there is isolated a substantial yield of 1-(3,4-dichlorophenyl)-3-methyl-2-pyrrolidinone.

When the above reaction is terminated just prior to the addition of methyl iodide and worked up by pouring into dilute hydrochloric acid, washing with water and air-drying an oil is isolated which slowly crystallizes. After two recrystallizations from methanol a white solid is produced which melts at 108° to 110° C. Infrared data confirmed that the compound was 1-(3,4-dichlorophenyl)-3-acetyl-2-pyrrolidinone. It contained by analysis 52.71% C, 4.12% H, and 5.08% N; calculated for $C_{12}H_{11}Cl_2NO_2$ is 52.96% C, 4.08% H, and 5.15% N.

*Example 3.—Preparation of 1-(3,4-dichlorophenyl)-3,5-dimethyl-2-pyrrolidinone*

(a) *Preparation of 1-(3,4-dichlorophenyl)-3-benzoyl-5-methyl-2-pyrrolidinone.*—To a slurry of 108 grams (2 moles) of sodium methoxide in 1 l. of dimethylformamide was added in one portion 244 grams (1 mole) of 1-(3,4-dichlorophenyl)-5-methyl-2-pyrrolidinone. With stirring there was added over a period of one and one-fourth hours 272 grams (2 moles) of methyl benzoate. An exotherm resulted in a temperature rise from 30° to 39° C. A solid precipitate formed and 200 ml. more of dimethylformamide was added to facilitate stirring. The reaction mixture was poured into 2 l. of 5% hydrochloric acid. The solid residue was filtered off, washed with 1 l. of water and dried in a vacuum oven to give 365 grams of tan solid. This was washed with isopropanol and re-dried to give 347 grams of a tan solid melting at 111° to 116° C. This is a 99% weight yield of 1-(3,4-dichlorophenyl)-3-benzoyl-5-methyl-2-pyrrolidinone. It was found to be over 97% pure by gas-liquid chromatography.

(b) *Methylation of 1-(3,4-dichlorophenyl)-3-benzoyl-5-methyl-2-pyrrolidinone.*—Into a 5 liter flask outfitted with a stirrer, thermometer, addition funnel and condenser were placed 331 grams (0.954 mole) of 1-(3,4-dichlorophenyl)-3-benzoyl-5-methyl-2-pyrrolidinone, 271 grams (1.908 moles) of methyl iodide, and 3 liters of methanol. There was added to this 112 grams (2.09 moles) of sodium methoxide over a period of 2.5 hours as the temperature gradually rose from 25° to 39° C. The mixture was stirred for 5 hours at 38° to 40° C. and then for 15 hours at 60° to 70° C. A brown solution resulted which gave a pH of 10. After cooling this was poured into a mixture of 6 liters of water and 3 liters of benzene. The benzene layer was washed three times with 2 liter portions of hot water and once with 2 liters of slightly acidulated water. Benzene and other volatile impurities were removed from the washed organic layer by heating under 20 mm. of pressure, first up to 100° C. and then for 3 hours at 200° C. The residue was 227 grams of a brown oil. It is an 81% yield of 1-(3,4-dichlorophenyl)-3,5-dimethyl-2-pyrrolidinone. In the oil there was found by analysis 5.37 N and 27.4% Cl; calculated for $C_{12}H_{13}Cl_2NO$ is 5.43% N and 27.5% Cl.

*Example 4.—Preparation of 1-(3-chloro-4-methylphenyl)-3-methyl-2-pyrrolidinone*

(a) *Preparation of 1-(3-chloro-4-methylphenyl)-3-benzoyl-2-pyrrolidinone.*—A slurry of 289 grams (5.36 moles) of sodium methoxide in 3 liters of dimethylformamide was made and to this was added 556 grams (2.68 moles) of 1-(3-chloro-4-methylphenyl)-2-pyrrolidinone. To the stirred mixture was added 730 grams (5.36 moles) of methyl benzoate over a period of 1.5 hours. The reaction temperature spontaneously rose from 24° to 45° C. during this time. It was stirred 3 hours longer and then poured into 5 liters of 5% hydrochloric acid. The residue was filtered off, washed with water, and air-dried. The solid was then slurried in 3 liters of isopropanol, filtered and air-dried to give 773 grams of a tan solid melting at 105° to 108° C. This was shown by gas-liquid chromatography to be over 97% pure and is a 92% yield of 1 - (3 - chloro - 4 - methylphenyl) - 3 - benzoyl - 2 - pyrrolidinone.

(b) *Methylation of 1-(3-chloro-4-methylphenyl)-3-benzoyl-2-pyrrolidinone.*—To a mixture of 470 grams (1.5 moles) of 1-(3-chloro-4-methylphenyl)-3-benzoyl-2-pyrrolidinone, 426 grams (3 moles) of methyl iodide, and 3 liters of methanol was added 178 grams (3.3 moles) of sodium methoxide over a period of 4 hours. An exotherm resulted which required slight cooling to keep the temperature below 40° C. The reaction mixture was stirred for 7 hours at 35° to 40° C. and then for 6 hours at 40° to 50° C. The brown solution, which gave a pH of 10, was poured into a mixture of 5 liters of water and 2.5 liters of benzene. The benzene layer was washed twice with 3 liters of hot water and once with 2 liters of slightly acidulated water and then heated at 20 mm. pressure and up to 190° C. to remove volatile impurities. This gave 330 grams of brown solid. This is essentially a quantitative yield of a product which is 95% pure 1-(3-chloro-4-methylphenyl)-3-methyl-2-pyrrolidinone by gas-liquid chromatography.

*Example 5.—Preparation of 1-(3,4-dimethylphenyl)-3-methyl-2-pyrrolidinone*

(a) *Preparation of 1-(3,4-dimethylphenyl)-3-benzoyl-2-pyrrolidinone.*—To a slurry of 162 grams (3 moles) of sodium methoxide and 301 grams (1.5 moles) of 1-(3,4-dimethylphenyl)-2-pyrrolidinone in 2.5 liters of dimethylformamide was added 408 grams (3 moles) of methyl benzoate in 30 minutes as the temperature slowly rose from 27° to 35° C. The mixture was stirred for 6 hours longer. After standing another 12 hours, the reaction mixture was poured into 6 liters of 5% hydrochloric acid. The residue was filtered off, washed with water and dried to give 396 grams of a yellow solid melting at 93° to 105° C. It was shown by gas-liquid chromatography to be over 97% and is a 90% yield of 1-(3,4-dimethylphenyl)-3-benzoyl-2-pyrrolidinone.

(b) *Methylation of 1-(3,4-dimethylphenyl)-3-benzoyl-2-pyrrolidinoine.*—A flask was charged with 399 grams (1.36 moles) of 1-(3,4-dimethylphenyl)-3-benzoyl-2-pyrrolidinone, 386 grams (2.72 moles) of methyl iodide, and 2.5 liters of methanol. To this was added with stirring 162 grams (2.99 moles) of sodium methoxide over a period of one and three-fourths hours as the temperature gradually rose from 28° to 41° C. At the end of the addition, the pH was 10; however, another 10 grams of sodium methoxide was then added to assure continued alkalinity. The reaction mixture was stirred 20 hours at 35° to 40° C. and then for 12 hours longer at 50° to 60° C. The clear, brown solution was poured into a mixture of 6 liters of water and 2 liters of benzene. The organic layer was separated, washed first with water, then with acidulated water, and concentrated at about 200° C. and 20 mm. pressure for 3 hours. The product remaining as a residue was 265 grams of a brown oil which was shown to be 98% pure by gas-liquid chromatography. It is a 95% yield of 1-(3,4-dimethylphenyl)-3-methyl-2-pyrrolidinone.

*Example 6.—Preparation of 1-(3-chloro-4-methoxyphenyl)-3-methyl-2-pyrrolidinone*

To a slurry of 10.8 grams (0.2 mole) of sodium methoxide and 22.6 grams (0.1 mole) of 1-(3-chloro-4-methoxyphenyl)-2-pyrrolidinone in 150 ml. of dimethyl sulfoxide is added 17.6 grams (0.2 mole) of methyl propionate over a period of about one-half hour. The reaction mixture is stirred 10 hours at 25° to 35° C. There is then added 28.4 grams (0.2 mole) of methyl iodide over a period of one hour and the stirring is continued at room temperature for 15 hours. The reaction mixture is poured into an excess of dilute hydrochloric acid over that required to neutralize the alkalinity. The resulting residue is washed with water, then recrystallized from ethanol containing decolorizing carbon to give a white solid melting at 102° to 103° C. By spectographic analysis, it is shown to be 1-(3-chloro-4-methoxyphenyl)-3-methyl-2-pyrrolidinone.

When in the above preparation there is substituted for the 1 - (3 - chloro - 4 - methoxyphenyl) - 2 - pyrrolidinone an equivalent amount of 1-(3-chloro-4-methylthiophenyl)-2-pyrrolidinone and the reaction is run and worked up in substantially the same manner, there is produced 1-(3-chloro-4-methylthiophenyl)-3-methyl-2-pyrrolidinone.

There is thus provided by this invention a new method for the preparation of herbicidal 1-aryl-3-methyl-2-pyrrolidinones. It will replace the previously used method requiring obscure lactones as a necessary reactant. This novel method utilizes readily available starting materials, is easily manipulated, gives the product in high yield without interfering side reactions, and gives a product of high purity which is immediately usable as a plant growth regulating chemical.

We claim:

1. A process for preparing a 1-phenyl-3-methyl-2-pyrrolidinone having the formula

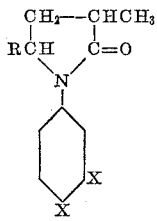

comprising
(a) reacting in the temperature range of 10° to 90° C. a 1-phenyl-2-pyrrolidinone having the formula,

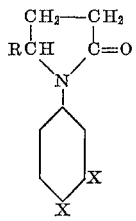

with an ester having the formula, R¹COOR°, in molar ratios of ester to pyrrolidinone of 1.5:1 to 4:1,
whereby there is produced a 1-phenyl-3-acyl-2-pyrrolidinone having the formula,

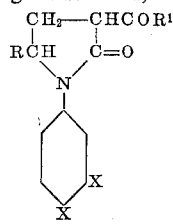

and
(b) reacting in the temperature range of 20° to 100° C. said 1-phenyl-3-acyl-2-pyrrolidinone with a methylating agent in molar ratios of methylating agent to pyrrolidinone of 1.5:1 to 2.5:1, wherein at least step (a) of steps (a) and (b) is conducted in the presence of an alkaline condensing agent, in which in all instances R is a member selected from the class consisting of hydrogen and methyl, X is a member selected from the class consisting of chlorine, methyl and —CH₃Y, in which Y is a chalcogen of atomic weight of 16 to 32, wherein when one X is —CH₃Y, the other is chlorine, R° is alkyl of 1 to 12 carbon atoms and R¹ is a member selected from the class consisting of hydrogen, alkyl of 1 to 3 carbon atoms, phenyl, R°O— and R°OOC—.

2. A process for preparing 1-(3,4-dichlorophenyl)-3-methyl-2-pyrrolidinone comprising reacting 1-(3,4-dichlorophenyl)-2-pyrrolidinone with methyl benzoate at a temperature of 10° to 90° C. to form 1-(3,4-dichlorophenyl)-3-benzoyl-2-pyrrolidinone and reacting said 1-(3,4-dichorophenyl)-3-benzoyl-2-pyrrolidinone with methyl iodide at a temperature of 20° to 100° C., both reactions being conducted in the presence of an alkaline condensing agent.

3. A process for preparing 1-(3-chloro-4-methoxyphenyl)-3-methyl-2-pyrrolidinone comprising reacting 1-(3-chloro-4-methoxyphenyl)-2-pyrrolidinone with methyl propionate at a temperature of 10° to 90° C. to form 1-(3-chloro-4-methoxyphenyl)-3-propionyl-2-pyrrolidinone and reacting said 1-(3-chloro-4-methoxyphenyl)-3-propionyl-2-pyrrolidinone with methyl iodide at a temperature of 20° to 100° C., both reactions being conducted in the presence of an alkaline condensing agent.

4. A process for preparing 1-(3-chloro-4-methylphenyl)-3-methyl-2-pyrrolidinone comprising reacting 1-(3-chloro-4-methylphenyl)-2-pyrrolidinone with methyl benzoate at a temperature of 10° to 90° C. to form 1-(3-chloro-4-methylphenyl)-3-benzoyl - 2 - pyrrolidinone and reacting said 1-(3-chloro-4-methylphenyl) - 3 - benzoyl-2-pyrrolidinone with methyl iodide at a temperature of 20° to 100° C., both reactions being conducted in the presence of an alkaline condensing agent.

5. A process for preparing 1-(3,4-dichlorophenyl)-3-methyl-2-pyrrolidinone comprising reacting 1-(3,4-dichlorophenyl)-2-pyrrolidinone with ethyl formate at a temperature of 10° to 90° C. to form 1-(3,4-dichlorophenyl)-3-formyl-2-pyrrolidinone and reacting said 1-(3,4-dichlorophenyl)-3-formyl-2-pyrrolidinone with methyl iodide at a temperature of 20° to 100° C., both reactions being conducted in the presence of an alkaline condensing agent.

6. A process for preparing 1-(3,4-dichlorophenyl)-3-methyl-2-pyrrolidinone comprising reacting 1-(3,4-dichlorophenyl)-2-pyrrolidinone with ethyl acetate at a temperature of 10° to 90° C. to form 1-(3,4-dichlorophenyl)-3-acetyl-2-pyrrolidinone and reacting said 1-(3,4-dichlorophenyl)-3-acetyl-2-pyrrolidinone with methyl iodide at a temperature of 20° to 100° C., both reactions being conducted in the presence of an alkaline condensing agent.

No references cited.

NICHOLAS S. RIZZO, *Primary Examiner.*